3,310,462
METHOD FOR CONTROLLING SOIL FUNGI
WITH ISOTHIOCYANATES
John C. Watts, Wilmington, Del., assignor to E. I. du
Pont de Nemours and Company, Wilmington, Del., a
corporation of Delaware
No Drawing. Filed June 25, 1963, Ser. No. 290,314
4 Claims. (Cl. 167—22)

This invention relates to the use of isothiocyanates as soil fungicides.

More specifically, it refers to a method for controlling soil fungi by applying to soil a fungicidal amount of a 1-(alkylthio)alkyl isothiocyanate.

I have discovered that such compounds possess outstanding soil fungicidal activity and exhibit no apparent phytotoxicity to crop plants, fruit trees and ornamentals when applied to the soil in normal commercial fungicidal dosages. Those isothiocyanates already known to the art to have fungicidal properties cannot be used in an in-the-row treatment because of their phytotoxicity to crop plants. Since in-the-row treatments are extremely effective for obtaining control of soil fungi this is a serious disadvantage.

Unlike other known fungicidal isothiocyanates the compounds used in this invention are not phytotoxic at fungicidal rates for in-the-row or broadcast soil treatments. Additionally, the compounds which I use in this invention are toxic to fungi at low rates, will protect crop plants from fungi throughout the growing season and have no residual effect which will tamper with the ecology of the surrounding area.

The soil fungicidal compounds used in my invention are structurally defined as follows:

(1) 

wherein
R is allyl or an alkyl group of less than four carbon atoms;
$R_1$ is hydrogen or methyl; and
$R_2$ is hydrogen or an alkyl group of less than four carbon atoms.

A preferred group of compounds because of outstanding activity at low rates is described as follows:

(2) 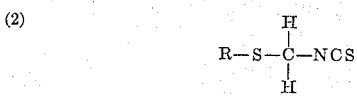

wherein
R is alkyl of less than four carbon atoms.

Particularly preferred because of commercial adaptability are methylthiomethyl isothiocyanate and ethylthiomethyl isothiocyanate.

Compounds of this invention are particularly effective in controlling the damping off fungi belonging to the genus Pythium. Other soil fungi controlled include Rhizoctonia spp., Fusarium spp., Phytophthora spp., Thielaviopsis spp. and Verticillium spp.

Fungicidal compositions of this invention can comprise one or more compounds of Formula 1 and one or more surface-active agents.

The surface-active agents or surfactant can include any of the anionic, cationic and non-ionic surface-active agents. Suitable surface-active agents are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers—Up to Date" (1962) by John W. McCutcheon, Inc., and Bulletin E–607 of the Bureau of Entomology and Plant Quarantine of the U.S. Department of Agriculture.

Among the more preferred surfactants are those anionic and non-ionic agents recognized in the art as wetting agents, detergents or emulsifiers. Among the anionic surfactants, preferred ones are alkali metal or amine salts of alkylbenzene sulfonic acids such as dodecylbenzene sulfonic acid, fatty alcohol sulfates such as sodium lauryl sulfate, alkyl naphthalene sulfonates, sodium-N-methyl-N-oleoyltaurate, fatty acid esters of sodium isethionate, dioctyl sodium sulfosuccinate and sodium dodecyldiphenyl oxide disulfonate. Among the non-ionic compounds, the preferred members are alkylphenoxy poly(ethyleneoxy)ethanols such as nonylphenol adducts with ethylene oxide; trimethylnonyl polyethylene glycol ethers, polyethylene oxide adducts to fatty and rosin acids, long chain alkyl or mercaptan adducts with ethylene oxide, ethylene oxide adducts to esters of sorbitol with fatty acids, and ethylene oxide propylene oxide condensates.

Most preferred anionic surfactants, because of the improved ease of dissemination for the active ingredient, are salts of alkyl naphthalene or alkyl benzene sulfonic acid.

Most preferred non-ionic surfactants, because of improved ease of dissemination for the active ingredient, are ethylene oxide adducts to alkylphenol, long chain alkyl alcohols containing eight through fourteen carbon atoms, long chain alkyl mercaptan containing eight through fourteen carbon atoms or sorbitan fatty acid esters.

Surfactants can be present in compositions in this invention in the range of 0.1 to 20% by weight. However, a range of 0.2 to 10% by weight is preferred.

Low strength compositions containing 1 to 5% by weight of a compound of Formula 1 can contain with or without surfactant present, common liquid solvents such as alcohols, ketones, chlorinated hydrocarbons, cellosolves, aliphatic and aromatic hydrocarbons and N,N-dialkyl amides.

Suitable liquid solvents include xylene, alkylated naphthalene, cyclohexane, cyclohexanone, chloroethanes, isophorone, and dimethyl formamide.

Preferably solvents having low phytotoxicity should be used. Among these are white oils, isoparaffins and other hydrocarbons having a low sulfonatable residue.

Low strength compositions containing one or more of the above-mentioned solvents can be used for direct application to the soil.

Additionally, a compound of Formula 1 can be formulated into more concentrated emulsifiable solutions containing 10 to 50% by weight of active, plus solvent and emulsifiers to make up 100%. The solvents can be water insoluble. Typical of the solvents used are higher ketones, higher aliphatic and aromatic hydrocarbons, chlorinated hydrocarbons and the like.

Preferred in the more concentrated solutions are solvents of low phytotoxicity such as the lower viscosity white mineral oils and the isoparaffins such as the "Soltrols."

Additional compositions can be formulated by adding a free-flowing inert powder to the active agent.

Free-flowing inert powders can be any of the extenders commonly employed in the fungicide art. They can include inert finely divided diluents such as natural clays including attapulgite or kaolinite, diatomaceous earth, pyrophyllite, talc, synthetic mineral fillers derived from silica and silicates such as synthetic fine silica and synthetic calcium or magnesium silicate, carbonates, phosphates, and sulfates, sulfur, lime, and flours such as wood, walnut shell, redwood, soybeans and cottonseed.

Dust compositions contain 1 to 30% by weight of the active ingredient. However, 3 to 15% by weight is preferred.

Particle size of the extender can vary considerably but will ordinarily be somewhat under 50 microns in the finished formulation. Ureas and other fertilizers can be added to dust formulations to bring the concentration of active ingredient present down to 0.5 to 5% by weight of the total formulation.

In powdered compositions the active compound can be combined with the powder to form granules having a particle size of 8 to 60 mesh. Since some of the active compounds used in this invention are oils at room temperature, granules employing these compounds can be prepared by spraying the active compound or a solution of the active compound over the surface of preformed clay granules or expanded vermiculite. Alternatively, the isothiocyanates or solutions thereof can be mixed with finely divided clays and the mixture then granulated. Preferred granules will contain 0.1 to 10% by weight of an ethylene oxide adduct to alkyl phenols. In these compositions, the active compound ordinarily will be present at the rate of 1 to 25% by weight. However, 3 to 15% by weight is the preferred.

In wettable powder compositions containing the active ingredient, one or more surfactants and an adsorbent solid diluent, the active compound ordinarily will be present in a concentration in the range of 15 to 85% by weight. It is preferred to have 15 to 50% by weight of active compound. Surfactants will be present in a range from 0.1 to 10% by weight to obtain adequate wetting and dispersion in water. Preferred surfactants are salts of alkyl benzene or naphthalene sulfonic acids. The remainder of the composition contains a solid absorbent diluent as described above. Preferred diluents are kaolinite, attapulgite or synthetic fine silica.

Wettable powders are prepared by mixing the ingredients in a blender and grinding the mixture in a hammer mill, air impact mill or the like until the particle size has been reduced to make spray application practical and easy. These wettable powders can also be blended with additional diluents, such as talcs, to form the above-mentioned dust mixtures for direct dry application.

Compositions of this invention can contain soil insecticides such as chlordane, DDT, dieldrin, endrin, aldrin, methoxychlor, and others for simultaneous control of insects and fungi in the soil. From 0.1 to 10 parts by weight of the insecticide is used for each one part by weight of a compound of Formula 1.

Wettable powder formulations containing an insecticide and a compound of Formula 1 are prepared by blending with a diluent and a surfactant and then grinding in a hammer mill or air impact mill to obtain intimately blended finely divided particles. This type formulation can be dispersed in water and sprayed in broadcast treatments followed by rotovation into the soil or sprayed in the furrow.

Dust compositions containing an insecticide and a compound of Formula 1 can be prepared by blending with a diluent and grinding in a hammer mill. These dust compositions can be applied to the soil in conventional dusting equipment in broadcast treatments, in-the-row treatments or as a hopper-box treatment as part of a seeding operation.

Insecticides can also be combined with compounds of Formula 1 in emulsifiable compositions by dissolving the insecticide and a compound of Formula 1 in an inert solvent containing an emulsifier. These compositions are emulsified in water and applied to the soil much like the wettable powders above.

In addition compositions can contain special additives such as corrosion inhibitors, pigments, antifoam agents and the like.

APPLICATION

Compounds used in this invention can be sprayed or injected on or into the soil. Soil applications are applied at or before planting, as a side dressing to living plants, in the furrow, as a hopper-box treatment or as a soil drench. The dosage is from one-third of an ounce to 200 pounds of active ingredient per acre treated depending on method of application and soil type.

Good results are obtained by an in-the-row treatment. Treatment is directed on a band approximately two to four inches wide in such a way as to strike the sides of the furrow as well as the bottom of the furrow. Seed can then be planted and the furrow closed. The seeds, seedlings, and growing plants are protected from attack by soil fungi. Alternatively, compounds of this invention can be injected into a closed furrow containing the seed. One-quarter to ten pounds of active ingredient per 12,000 feet of a two-inch wide row gives satisfactory control of fungi.

A preferred dosage in the row because of exceptionally good control of fungi at low cost is one-half to three pounds of active ingredient per 12,000 feet of a two-inch wide row. Obviously, if the band width treated is more or less than two inches the dosage rate is adjusted accordingly. In-the-row treatment is extremely useful in protecting seeds, newly-germinated seedlings, and growing plants of corn, tomatoes, watermelon, squash, carrots, lettuce, cantaloupe, peppers, cucumbers, beans, cotton, tobacco, ornamentals and the like from attack by fungi.

Soil drench treatments protect seeds, seedlings, and plants from the ravages of soil fungi by application of the compounds used in this invention at rates of about 20 to 100 pounds of active ingredient per acre.

Compounds used in this invention can also be used as seed treatments. For example, the material can be applied as a slurry to the surface of seeds or can be mixed with seeds such as cotton seeds in the hopper-box treatment at planting time at rates of one to fifty ounces of active ingredient per cwt. of seeds to give control of soil fungi. A preferred rate because of excellent control and low cost is two to sixteen ounces of active ingredient per cwt. of seeds. When cotton seeds are treated with compounds within the scope of this invention in the above-described manner, effective protection of the seeds, seedlings and growing plants is obtained against soil fungi.

The compounds of Formula 1 can be used in either water suspensions or oil solutions for the fungicidal treatment of organic materials such as wood, textile, fabrics, paints, leather, cordage, paper and insulating materials. For example, methylthiomethyl isothiocyanate can be used as an emulsifiable concentrate and diluted with water to an active ingredient concentration of 0.1 to 10% by weight. This formulation is employed as a dip for treating paper and insulating materials rendering them resistant to attack by fungi. In a similar fashion, the active compound is dissolved in a low-cost solvent such as Stoddard solvent, xylene, kerosene and the like to yield solutions with active ingredient concentrations ranging from 0.1 to 10%. This formulation is employed for industrial fungicidal purposes such as:

(a) Dips for leather, cordage, fabrics and textiles, and
(b) Dips and pressure treatments for wood products including window frames, ties and telephone poles.

The active ingredient can be formulated into the standard paint formulations to yield mixtures containing 0.1 to 10% by weight of the active compound.

In order that this invention can be better understood the following additional examples are provided. It should be understood that all percentages given are by weight unless otherwise specified.

*Example 1*

The following formulation is prepared by spraying the active ingredient onto the inert ingredients while blending in a ribbon blender until a homogeneous mixture is obtained. This mixture is then micropulverized to obtain a wettable powder in which substantially all the particles have a particle size less than 50 microns.

|  | Percent |
|---|---|
| 1-(methylthio)ethyl isothiocyanate | 25.0 |
| Pyrophyllite clay | 72.0 |
| Methyl cellulose, low viscosity | 0.5 |
| Alkyl naphthalene sulfonic acid, sodium salt | 1.5 |
| Anhydrous disodium phosphate | 1.0 |

This wettable powder is mixed with water and injected into soil infested with the black shank fungus *Phytophthora parasitica* var. *nicotinae*. The rate used is thirty pounds per acre of active ingredient. Tobacco seedlings planted in the treated soil are protected from attack by this fungus, resulting in a healthy crop of tobacco. Tobacco plants planted in untreated soil grow poorly resulting in less yield than from tobacco grown in treated soil.

*Examples 2 and 3*

The following compounds are substituted one at a time for the 1-(methylthio)ethyl isothiocyanate in Example 1 in like amount by weight. They are each formulated and applied in like manner. Like results are obtained.

(2) 1-(methylthio)propyl isothiocyanate.
(3) 1-methyl-1-(methylthio)propyl isothiocyanate.

*Example 4*

| | Percent |
|---|---|
| Methylthiomethyl isothiocyanate | 60.0 |
| Synthetic fine silica | 37.5 |
| Sodium dioctyl sulfosuccinate | 0.5 |
| Sodium lignosulfonate | 2.0 |

The above ingredients are blended and ground in a hammer mill to obtain a homogeneous mixture in which substantially all of the particles are 50 microns or less.

This wettable powder is mixed with water and is injected into soil infested with the black root rot fungus *Thielaviopsis basicola*. The rate used is thirty pounds per acre of active ingredient. Tobacco seedlings planted in the treated soil are protected from attack by the fungus, resulting in a healthy crop of tobacco. Tobacco plants planted in untreated soil grow poorly resulting in less yield than from tobacco grown in treated soil.

*Example 5*

| | Percent |
|---|---|
| Allylthiomethyl isothiocyanate | 25 |
| Isoparaffin hydrocarbon | 70 |
| Mixed polyoxyethylene ethers and oil soluble sulfonates | 5 |

The active ingredients and the emulsifier are added to the alkylated naphthalene in an agitated vessel which is provided with a steam jacket to make gentle heating possible. Heat and agitation are supplied until a homogeneous mixture is obtained which can be emulsified readily in water for spray application.

This formulation is emulsified in water and sprayed in an open furrow at one pound per acre of active ingredient. Beans seeds are planted in the treated furrow at the same time as the treatment is made and the furrow closed. The bean seeds germinate and the seedlings and growing plants are protected from attack by the fungus *Rhizoctonia solani* resulting in a healthy stand and good crop of beans. Bean seeds planted in untreated soil are essentially destroyed and the few plants that remain are severely diseased and produce a poor crop.

*Example 6*

The following product is prepared by blending the ingredients as listed below and then passing the mixture through a deagglomerator such as an Entoleter mill to obtain a finely divided dust in which the soil fungicides and soil insecticides are uniformly distributed throughout.

| | Percent |
|---|---|
| Wettable powder of Example 4 | 16.8 |
| Dieldrin 50% W.P. | 6.0 |
| Micaceous talc | 77.2 |

This mixture which contains 10% methylthiomethyl isothiocyanate and 3% active dieldrin is useful as a hopper box treatment for seeds such as cotton. For application ten pounds of this dust is mixed with a hundred weight of machine-delinted cotton seed for hopper box application at planting time. After planting these protected seeds germinate and the cotton seedlings and growing plants are protected from soil fungi such as Rhizoctonia spp. and Pythium spp. resulting in a healthy stand of cotton which produces an excellent yield of cotton per acre. Seeds not treated as above frequently do not germinate and those that do result in seedlings which are later attacked by the above fungi resulting in a poor crop of cotton.

*Example 7*

| | Percent |
|---|---|
| 1-(ethylthio)-1-methylbutyl isothiocyanate | 5 |
| Attapulgite clay | 15 |
| Kaolinite | 80 |

The active ingredient is blended with the attapulgite and ground in a hammer mill to obtain a concentrate which is then diluted into the finished dust by blending with the kaolinite followed by deagglomeration to obtain a uniform mixture.

This formulation is rotovated into soil infested with soil fungi such as Rhizoctonia spp. and Pythium spp. and *Fusarium oxysporum* f. *vasinfectum*. The rate used is thirty pounds per acre of active ingredient. Tomato plants planted in the treated soil are protected from attack by these soil fungi resulting in healthy plants and excellent yields of tomatoes. Tomato plants planted in untreated soil frequently damp off and those that survive have a high incidence of wilt resulting in poor plants.

*Example 8*

Soil fungicide granules are prepared by preparing the following mixture:

| | Parts |
|---|---|
| 1-methyl-1-(methylthio)ethyl isothiocyanate | 2 |
| White oil | 5 |

These ingredients form a homogeneous solution which is then sprayed over the surface of 93 parts of pre-formed and pre-screened clay granules containing substantially all of the granules in the fifteen to thirty mesh range. The granular product is then suitable for application in the standard granule applicators to soil prior to planting.

This formulation is rotovated into soil infested with soil fungi such as *Rhizoctonia solani* and *Pythium* spp. The rate used depending on soil type is from fifteen to sixty pounds per acre of active ingredient. Cucumber seeds are planted and subsequently grow and produce an acceptable crop. Cucumber seed planted in untreated soil frequently do not germinate and those that do are generally diseased resulting in reduced yields.

*Examples 9–12*

The following compounds are substituted one at a time for the 1-methyl-1-(methylthio)ethyl isothiocyanate in Example 8 in like amount by weight. They are each formulated and applied in like manner. Like results are obtained.

(9) 1-(methylthio)-1-methylpropyl isothiocyanate.
(10) 1-(methylthio)ethyl isothiocyanate.
(11) allythiomethyl isothiocyanate.
(12) 1-(allythio)-1-methylethyl isothiocyanate.

The invention claimed is:

1. A method for controlling soil fungi comprising applying to soil a fungicidal amount of a compound of the formula:

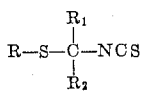

wherein

R is selected from the group consisting of allyl and alkyl of less than 4 carbon atoms;

$R_1$ is selected from the group consisting of hydrogen and methyl; and $R_2$ is selected from the group consisting of hydrogen and alkyl of less than 4 carbon atoms.

2. A method for controlling soil fungi comprising applying to soil a fungicidal amount of a compound of the formula:

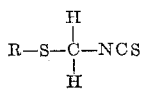

wherein

R is alkyl of less than 4 carbon atoms.

3. A method for controlling soil fungi comprising applying to soil a fungicidal amount of methylthiomethyl isothiocyanate.

4. A method for controlling soil fungi comprising applying to soil a funigicidal amount of ethylthiomethyl isothiocyanate.

References Cited by the Examiner

UNITED STATES PATENTS 3,085,045   4/1963   Lukes et al. _____ 167—30

FOREIGN PATENTS 1,025,520   4/1953   France.
679,997   9/1939   Germany.
481,733   3/1938   Great Britain.
845,564   8/1960   Great Britain.

OTHER REFERENCES

Chem. Abst. vol. 43; 1948, page 7410B, Patent Office Scientific Library.

Plant Disease Reporter, vol 45, No. 1, pp. 54 to 57, Jan. 15, 1961.

SAM ROSEN, *Primary Examiner.*

JULIAN S. LEVITT, *Examiner.*

GEORGE A. MENTIS, *Assistant Examiner.*